(12) United States Patent
Nagpal et al.

(10) Patent No.: US 11,561,826 B1
(45) Date of Patent: Jan. 24, 2023

(54) SCHEDULING PROCESSING OF MACHINE LEARNING TASKS ON HETEROGENEOUS COMPUTE CIRCUITS

(71) Applicant: Xilinx, Inc., San Jose, CA (US)

(72) Inventors: Sumit Nagpal, Hyderabad (IN); Abid Karumannil, Hyderabad (IN); Vishal Jain, Chhindwara (IN); Arun Kumar Patil, Bangalore (IN)

(73) Assignee: XILINX, INC., San Jose, CA (US)

( * ) Notice: Subject to any disclaimer, the term of this patent is extended or adjusted under 35 U.S.C. 154(b) by 237 days.

(21) Appl. No.: 17/096,136

(22) Filed: Nov. 12, 2020

(51) Int. Cl.
*G06F 9/46* (2006.01)
*G06F 9/48* (2006.01)
*G06F 16/901* (2019.01)
*G06N 3/08* (2006.01)

(52) U.S. Cl.
CPC ........ *G06F 9/4881* (2013.01); *G06F 16/9024* (2019.01); *G06N 3/08* (2013.01)

(58) Field of Classification Search
CPC ...... G06F 9/4881; G06F 16/9024; G06N 3/08
See application file for complete search history.

(56) References Cited

U.S. PATENT DOCUMENTS

2019/0114535 A1* 4/2019 Ng ................. G06N 3/0454
2020/0012521 A1* 1/2020 Wu ................. G06F 9/4881

* cited by examiner

*Primary Examiner* — Wissam Rashid
(74) *Attorney, Agent, or Firm* — Crawford Maunu PLLC

(57) ABSTRACT

Scheduling work of a machine learning application includes instantiating kernel objects by a computer processor in response to input of kernel definitions. Each kernel object is of a kernel type indicating a compute circuit. The computer processor generates a graph in a memory. Each node represents a task and specifies an assignment of the task to one or more of the kernel objects, and each edge represents a data dependency. Task queues are created in the memory and assigned to queue tasks represented by the nodes. Kernel objects are assigned to the task queues, and the tasks are enqueued by threads executing the kernel objects, based on assignments of the kernel objects to the task queues and assignments of the tasks to the kernel objects. Tasks are dequeued by the threads, and the compute circuits are activated to initiate processing of the dequeued tasks.

20 Claims, 8 Drawing Sheets

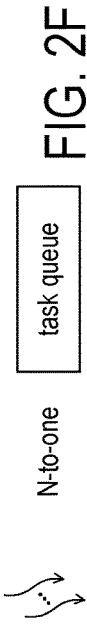

different tasks from one job graph can be queued in different task queues

FIG. 2A

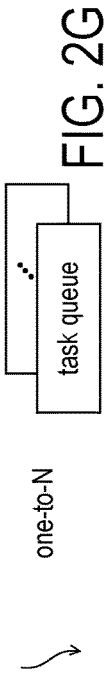

one task queue can queue tasks from different job graphs

FIG. 2B

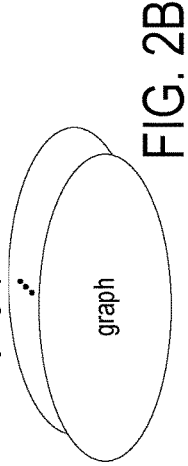

one or more kernel objects can get tasks from the same task queue

FIG. 2C a kernel object can get tasks from only one task queue

FIG. 2D

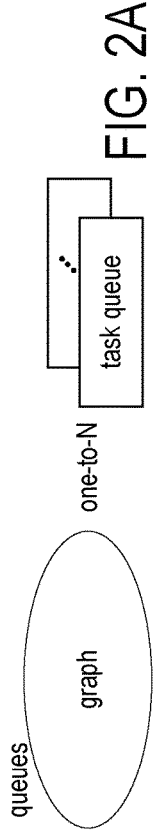

a kernel object can have one or more threads active to get tasks from a task queue

FIG. 2E one or more threads, of one or more kernel objects, can get tasks from the same task queue

FIG. 2F one thread can enqueue tasks to different task queues

FIG. 2G

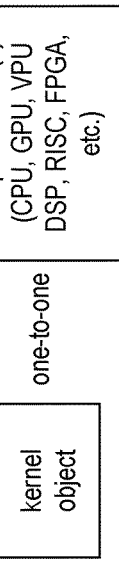

a task can be executed by any one of one or more kernels associated with the node of the task

FIG. 2H

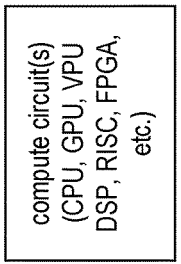

one kernel object can interface to one compute circuit

FIG. 2I

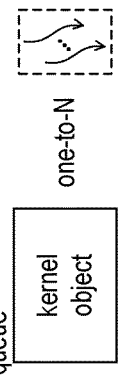

one compute circuit can support one or more kernel objects of the same kernel type

FIG. 2J

SCHEDULING PROCESSING OF MACHINE LEARNING TASKS ON HETEROGENEOUS COMPUTE CIRCUITS

COPYRIGHT NOTICE

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

TECHNICAL FIELD

The disclosure generally relates to scheduling the processing of tasks on heterogeneous compute circuits.

BACKGROUND

Deep learning is a class of machine learning algorithms that use multiple layers of nonlinear processing units for feature extraction and transformation. Deep learning algorithms can be unsupervised (e.g., pattern analysis) or supervised (e.g., classification). The deep learning algorithm can be implemented using layers of an artificial neural network (ANN) (referred to herein as a "neural network").

In general, a neural network is a collection of nodes (i.e., the "neurons") that are connected in a graph. A node in a neural network computes a sum of weighted inputs and adds an optional bias to the sum. The output of the node is a function of the final sum (referred to as an "activation function"). Example activation functions include the sigmoid function, the hyperbolic tangent (tanh) function, the Rectified Linear Unit (ReLU) function, and the identity function. Neural network models are often organized into layers of nodes, which define a specific topology, and corresponding weights and biases. The weights and biases are referred to as network parameters.

A neural network application involves, in addition to the inference stage, compute-intensive stages such as pre-processing and post-processing of data. Pre-processing can include reading data from retentive storage, decoding, resizing, color space conversion, scaling, cropping, etc. Post-processing operations can include non-maximum suppression, SoftMax, and reformatting, for example.

A neural network can be defined as a directed acyclic graph in which the nodes represent the functions performed in processing an input data set. Machine learning platforms such as Caffe and TensorFlow provide frameworks for defining and running graphs of neural networks. The different functions can be performed on different compute circuits (or "kernels") in order to improve throughput. For example, field programmable gate arrays (FPGAs) have been used to implement circuits that accelerate functions called from software in neural network applications.

SUMMARY

A disclosed method includes instantiating a plurality of kernel objects by a computer processor in response to input of a plurality of kernel definitions, respectively. Each kernel object is of a kernel type of a plurality of kernel types, and each kernel type indicates a compute circuit of a heterogeneous plurality of compute circuits. The method includes generating a graph in a memory by the computer processor. The graph has nodes and edges, each node represents a task and specifies an assignment of the task to one or more of the kernel objects, and each edge represents a data dependency between nodes. The method includes creating a plurality of task queues in the memory, and assigning each task queue to queue tasks represented by one or more of the nodes. The method includes assigning each of the kernel objects to one of the task queues and enqueuing the tasks represented by the nodes in the plurality of task queues by threads executing the kernel objects on the computer processor. The threads are enqueued based on assignments of the kernel objects to the task queues and assignments of the tasks to the kernel objects. The method includes dequeuing tasks from the plurality of task queues by threads executing the kernel objects based on the assignments of the kernel objects to the task queues and the assignments of the tasks to the kernel objects. The method includes activating ones of the compute circuits by threads executing the kernel objects to initiate processing of the dequeued tasks.

A disclosed system includes one or more processors and a memory arrangement configured with instructions that when executed by the one or more processors cause the one or more processors to perform operations. The operations include instantiating a plurality of kernel objects in response to input of a plurality of kernel definitions, respectively. Each kernel object is of a kernel type of a plurality of kernel types, and each kernel type indicates a compute circuit of a heterogeneous plurality of compute circuits. The operations include generating a graph in the memory arrangement. The graph has nodes and edges, each node represents a task and specifies an assignment of the task to one or more of the kernel objects, and each edge represents a data dependency between nodes. The operations include creating a plurality of task queues in the memory arrangement, and assigning each task queue to queue tasks represented by one or more of the nodes. The operations include assigning each of the kernel objects to one of the task queues and enqueuing the tasks represented by the nodes in the plurality of task queues by threads executing the kernel objects. The threads are enqueued based on assignments of the kernel objects to the task queues and assignments of the tasks to the kernel objects. The operations include dequeuing tasks from the plurality of task queues by the threads based on the assignments of the kernel objects to the task queues and the assignments of the tasks to the kernel objects. The operations include activating ones of the compute circuits by threads executing the kernel objects to initiate processing of the dequeued tasks.

Other features will be recognized from consideration of the Detailed Description and Claims, which follow.

BRIEF DESCRIPTION OF THE DRAWINGS

Various aspects and features of the methods and systems will become apparent upon review of the following detailed description and upon reference to the drawings in which:

FIG. 2A shows the relationship between a graph and task queues;

FIG. 2B shows the relationship between a task queue and graphs;

FIG. 2C shows the relationship between kernel objects and a task queue;

FIG. 2D shows the relationship between a kernel object and a task queue;

FIG. 2E shows the relationship between a kernel object and a set of threads;

FIG. 2F shows the relationship between threads and a particular task queue;

FIG. 2G shows the relationship between a particular thread and task queues;

FIG. 2H shows the relationship between a task and kernel objects;

FIG. 2I shows the relationship between a kernel object and a compute circuit;

FIG. 2J shows the relationship between a compute circuit and kernel objects;

DETAILED DESCRIPTION

Figure 1:
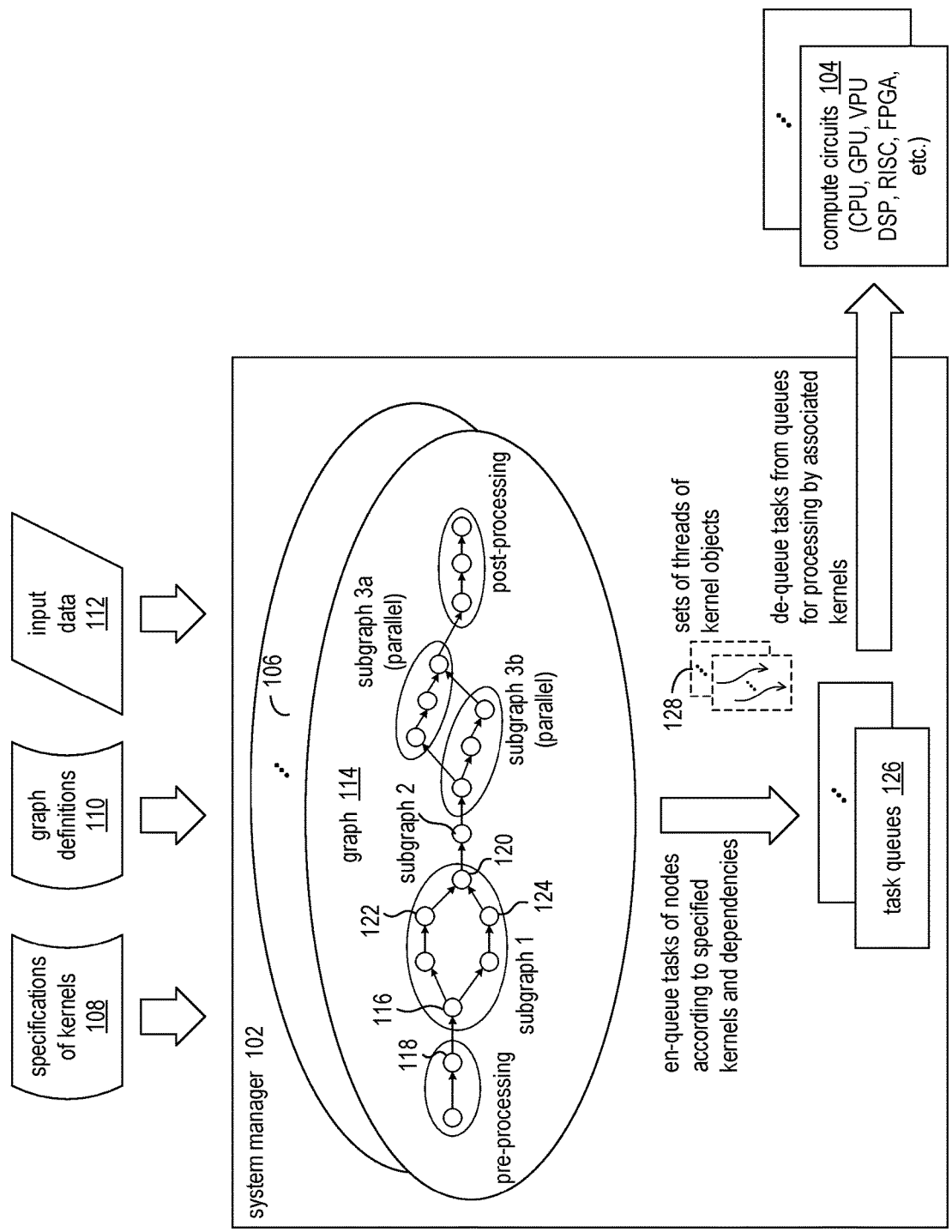
FIG. 1 shows a system for processing one or more ML applications according to the disclosed methods.

In the following description, numerous specific details are set forth to describe specific examples presented herein. It should be apparent, however, to one skilled in the art, that one or more other examples and/or variations of these examples may be practiced without all the specific details given below. In other instances, well known features have not been described in detail so as not to obscure the description of the examples herein. For ease of illustration, the same reference numerals may be used in different diagrams to refer to the same elements or additional instances of the same element.

Pipelining graph operations in Caffe and TensorFlow is limited to nodes asynchronously inputting data to nodes of the neural network. Reading of data is performed by CPUs, and subsequent processing is performed by accelerators such as GPUs, FPGA, etc. In the disclosed approaches, the processing associated with all nodes in the application graph can be easily pipelined.

Some approaches for defining graphs can be tedious to maintain and implementations of graphs may not provide the desired level of performance. For example, a graph can be defined by a Python script. However, increasing the number of nodes and branches in the graph can be complex and error-prone. Python libraries for database management are used to communicate data between nodes, which impedes application throughput and makes the application dependent on the provider of the database management libraries.

Prior approaches to defining application graphs and deploying an implementation are difficult to scale, such as when new nodes are added to the application graph or new kernels are used. For example, one particular comparable method in Vitis™-AI development environment supports a fixed number of threads. In the Caffe environment, an execution mechanism is provided for additional/unsupported layers by way of Python code, which is often done only for experimental purposes because the performance of the Python functions is not good. Following experimentation, developers often replace the Python functions with C code, which necessitates recompilation of the Caffe code. The disclosed approaches enable a developer to easily add nodes, kernels, and processing threads to a neural network application.

According to the disclosed approaches, a framework is provided to prepare a machine learning (ML) application and then execute the ML application on heterogeneous compute circuits. The framework supports easily creating a graphical representation of tasks of the ML application and scheduling tasks of the application to improve processing throughput. The framework provides parallel deployment of workloads, achieves high utilization of the compute enables convenient identification of bottlenecks in the system.

A kernel is a specific configuration of hardware or hardware executing software that performs a designated task of the ML application. Examples of kernels defined according to the approaches described herein are shown in Table 1.

TABLE 1

| Name | Description |
| --- | --- |
| DPUCADX8GRunner | Runs inference on DPUCADX8G (DPUv1 Alveo U-200/U-250) |
| CaffeKernel | Executes a network using Caffe framework |
| ImageRead | Reads an image with provided path |
| ClassificationAccuracy | Measures accuracy of a classification network (Top-1/Top-5) |
| ClassificationFCSoftMaxTopK | Performs FC + Softmax + TopK for a classification network |
| Classification ImreadPreProcess | Reads an image and preprocesses it for classification network |
| ClassificationPreProcess | Preprocesses an image for a classification network |
| Classification PostProcess | Performs Softmax + TopK for a classification network |
| Detection ImreadPreProcess | Reads and Preprocesses an image for YOLO network |
| Detection PreProcess | Preprocesses an image for YOLO network |
| PythonKernel | Executes kernels written in Python |
| SaveBoxesDarknetFormat | Saves results of detection network in Darknet format for mAP calc |
| YoloPostProcess | Postprocesses data for YOLO v2/v3 network |
| ClassificationPreProcessAccel | Performs FPGA accelerated pre-processing for classification netwo |

The processing of a kernel is specified by a "kernel object." For example, a kernel object having the same name as kernel, DPUCADX8GRunner, specifies inference processing on an FPGA (an Alveo U-200/U-250), and a kernel object having the same name as kernel, CaffeKernel, executes a network on a CPU using a Caffe framework on a CPU.

The processing of kernels is performed by heterogeneous compute circuits. The "kernel type" of a kernel identifies a compute circuit on which the processing of the kernel is performed. The processing of a kernel can be performed on different compute circuits, in which case the kernel type is the combination of the different types of compute circuits. Kernel types can include CPU, GPU, VPU, DSP, RISC processor, FPGA, ASIC, SoC or combinations thereof, for example.

The work or job to be performed by an ML application can be specified as a directed acyclic graph and represented by nodes and edges in a computer system memory. Each node represents a task to be performed and specifies an assignment of the task to one or more kernels, and each edge represents a data dependency between nodes. Examples of tasks include inputting data, formatting input data, computing operations associated with layers of a neural network, and those in the description of the kernels in Table 1.

The disclosed methods and systems enable assignment of a task to multiple kernels of different kernel types. For example, a task can be assigned to both a kernel of kernel type CPU and a kernel of kernel type FPGA. The task is eligible to be performed by either of the kernels.

Task queues are created in the memory for enqueuing tasks represented by nodes of the graph(s). Each kernel is associated with one and only one task queue. However, more than one kernel can be associated with one (the same) task queue. A task queue can be assigned to queue tasks represented by one or more nodes of one or more graphs. A single task queue is created to queue tasks associated with multiple nodes if at least one same kernel is in the sets of kernels assigned to the multiple nodes. For example, if node N1 has assigned kernels K1 and K2, and node N2 has assigned kernels K2 and K3, then the tasks represented by nodes N1 and N2 are queued to the same task queue. The threads of K1 are limited to dequeuing tasks represented by N1, the threads of K2 can dequeue tasks represented by either N1 or N2, and the threads of K3 are limited to dequeuing to tasks represented by N2.

The kernel objects are associated with threads that enqueue and dequeue tasks in and from the task queues. A thread enqueues a task, which is represented by a node in the graph, in a task queue in response to completion of the task(s) of the parent node(s) of that node. The task queue in which a task is enqueued by a thread is the task queue that is associated with the node that represents the task.

A thread associated with a kernel object dequeues a task from the task queue to which that kernel object is assigned. The thread executing on the kernel object activates a compute circuit that is associated with the kernel object to initiate processing of the dequeued task. For example, for a kernel object of a CPU kernel type, the thread can initiate program code on the CPU and associated with that kernel object for performing the designated task on the data specified by task parameters. For an FPGA kernel type, the kernel object can provide to the FPGA addresses in an external memory of data to be processed along with control information.

FIG. 1 shows a system for processing one or more ML applications according to the disclosed methods. The system generally includes a system manager 102 that is coupled to a collection of heterogeneous compute circuits 104. The system manager is a computer system that is configured to direct the operations of compute circuits according to tasks defined by graphs 106. The system manager inputs kernel specifications 108 and graph definitions 110 to instantiate kernel objects (not shown) and graphs 106. The input data 112 is input by a kernel object at application runtime, such as reading data from retentive storage or a networked source. The scheduling of tasks of the graph(s) to be performed by the compute circuit is explained in the description of FIGS. 3, 4, and 5.

A system can be configured to include different compute circuits to execute different tasks of the ML application(s). For example, a CPU can be programmed to perform a pre-processing task of a graph, and an FPGA can be configured to perform tasks of tensor operations as part of inference. Accessing the computational capabilities of the compute circuits is achieved through kernel objects, which are defined in the kernel specifications 108.

The properties of a kernel object can include name, purpose, device type, a path to a shared library that contains the functions to interface to and/or be performed by the compute circuit, a number of parallel threads that can execute functions of the kernel object, and a list of parameters used by the kernel object. Kernel specifications can be specified as JSON files, for example. In an exemplary approach, kernel objects can be synchronous (blocking) by default. A kernel object can alternatively be defined to operate asynchronously (non-blocking). Example 1 shows a JSON description of a kernel.

```
/* Copyright 2019 Xilinx Inc.*/
{
    "kernel_name" : "ImageRead",
    "description" : "Reads an image from the image_path
        provided",
    "kernel)type" : "cpp",
    "device_type" : "cpu",
    "kernel_lib" : "libs/libImageRead.so",
    "num_cu" : 8,
    "param_list" : {
        "image_path" : {"type" : "string"}
    }
}
```

Example 1

The JSON specification shows that each kernel is associated with a shared library (the ".so" file), which is expected to have a "getKernel" function. The getKernel function returns a kernel object of a KernelBase class. Example 2 shows an example of a KernelBase class.

```
/* Copyright 2019 Xilinx Inc.*/
    class KernelBase
    {
        public:
            virtual ~KernelBase ( ) { }
            /// Returns total number of CPU threads to be allocated
            /// for this kernel. If there are multiple nodes of same
            /// kernel, allocated threads are shared. Alternately, it
            /// can be specified in kernel JSON also. Default is -1.
            /// It means number provided in JSON is used. If it is
            /// not mentioned in JSON also, a single thread is used,
            virtual int getNumCUs( ) {return -1;}
            /// Returns whether kernel execution is an asynchronous
            /// operation.
            virtual bool isExecAsync ( ) { return false; }
            /// Actual operation to be executed. It could be either
            /// blocking or non-blocking(async) call. If async, it
            /// is mandatory to implement wait( ) method also.
                /// @param in Input data to the kernel
                /// @param out Output data of the kernel
                /// @param params Node parameters. Unique to a
                /// particular node.
                /// @param dynParams Input parameters. It changes with
```

```
            /// each input.
            /// @return execID An ID unique to this operation.
            /// Used for waiting for its result in async call.
            virtual int exec_async (
                std::vector<AKS::DataDescriptor *> &in,
                std::vector<AKS::DataDescriptor *> &out,
                NodeParams* params,
                DynamicParamValues* dynParams) = 0;
            /// Wait operation for asynchronous kernel execution
            /// Required only if isExecAsync( ) is true.
            /// @param execID An ID returned by exec_async call
                /// in async call.
            // @params Node parameters. Unique to a particular
                /// node.
            virtual void wait (int, NodeParams*) { }
            /// Initialize a Node
            /// The system manager (or AI Kernel Scheduler,
                /// "AKS") performs this operation for each node in
                /// a graph as soon as graph is loaded. Any setup
            /// operations wrt a node could be implemented here
            /// @param params Node parameters. Unique to a
                /// particular node.
            virtual void nodeInit(NodeParams*) { }
            /// Report any info by each node
            /// If any kernel wants to print any info after all jobs,
                /// it could be added here. Eg: Accuracy kernel wants
            /// to report final accuracy over a full dataset. It is
                /// invoked for every node by SysManagerExt::report( )
            virtual void report(AKS::NodeParams* nodeParams) { }
    };
}
```

Example 2

A notable property of the exemplary KernelBase class is that an inherited kernel class must implement an "exec_async" function, which is called by the system manager to run the kernel. By default, all kernels are blocking. For non-blocking kernels, the function will return a job_id of the kernel. If a kernel is non-blocking, the "isExecAsync" function should be implemented to return the Boolean value "true." A non-blocking kernel must implement a "wait" function. The wait function is called by a thread dedicated to waiting for the results of the associated task.

A kernel uses the getNumCUs function to determine the number of threads executing the kernel object, which is configurable in the JSON description of the kernel. The "nodeInit" function initializes the kernel object with node-specific data. For example, an inference kernel object may need to load different networks that are used in different graphs. Thus, for each node that specifies an assignment of the task to a kernel, the kernel object makes separate calls to nodeInit with the parameter values specified by the node.

An example of a kernel is shown in Example 3. The AddKernelBase defines a "getKernel" function, which returns an object of the class "AddKernel" inherited from KernelBase. The AddKernel class implements the "exec_async" function.

```
/* Copyright 2019 Xilinx Inc.*/
class AddKernelBase: public AKS::KernelBase {
    public:
        int exec_ async (
            std::vector<AKS::DataDescriptor *> &in,
            std::vector<AKS::DataDescriptor *> &out,
            AKS::NodeParams* params,
            AKS::DynamicParamValues* dynParams);
        int getNumCUs(void);
};
extern "C" {
    AKS::KernelBase* getKernel (AKS::NodeParams* params) {
        AddKernelBase* base = new AddKernelBase( );
        return base;
    }
} // extern C
int AddKernelBase::getNumCUs(void)
{
    return 1;
}
int AddKernelBase::exec_async (
    vector<AKS::DataDescriptor *>& in,
    vector<AKS::DataDescriptor *>& out,
    AKS::NodeParams* params, AKS::DynamicParamValues* dynParams)
{
    AddKernelBase* kbase = this;
    float* input = (float*)(in[0]->data( ));
    // Create one output buffer and resize buffer to required size
    out.push_back(new AKS::DataDescriptor({1},
        AKS::DataType::FLOAT32));
    float* output = (float*)(out[0]->data( ));
    output[0] = input[0] + params->_intParams["adder"];
    std::cout << "Node Output : " << params << " " << input[0]
        << " " << output[0] << std::endl;
    return −1;
}
```

Example 3

The work to be performed by an ML application on an input data set can be divided into the tasks to be performed and each task can be represented as a node in a graph. For example, a classification application can have tasks for image read, image resize, image subtraction, inference, and SoftMax calculation. Some tasks can be divided into subtasks, and the subtasks represented as subgraphs. For example, separate tensor operations involved in inference can be nodes of a subgraph. Some tasks can be combined into a single task. For example, image read, image resize, and mean subtraction can be combined into a "pre-processing" task and represented by a single node. The task of a node is associated with one or more kernels. The graph definitions can be specified as JSON files, for example.

Each graph has a name and specifies a list of nodes. Examples of networks that can be used in different ML applications for which graphs can be defined include GoogleNet, ResNet50, YOLOv3-Tiny, YOLOv2, and Face Detect. The properties of each node include: a unique name, which kernel objects can process the task of the node, specifications of parameters for each associated kernel object, and a list of nodes ("child" nodes) to which the node connects. The child nodes of a parent node are dependent on completion of the task of the parent node. An example of a GoogleNet graph defined according to the disclosed methods is shown in Example 4.

```
/* Copyright 2019 Xilinx Inc.*/
{
    "graph_name": "googlenet",
    "node_list": [
        {
            "node_name": "preproc",
            "node_params" : {
                "ClassificationImreadPreProcess" : {
                    "net_w" : 224,
                    "net_h" : 224,
                    "net_c": 3,
                    "mean": [ 104.007, 116.669, 122.679]
                }
```

-continued

```
    },
        "next_node": ["googlenet_v1_fpga"]
    },
    {
        "node_name": "googlenet_v1_fpga",
        "node_params": {
            "DPUCADX8Grunner": {
                "acquire_cu": 0,
                "num_fpga": 1,
                "xclbin":"/opt/xilinx/overlaybins/xdnnv3",
                "vitis_rundir": "graph_zoo/meta_googlenet"
            }
        },
        "next_node": [ "googlenet_v1_post" ]
    },
    {
        "node_name": "googlenet_v1_post",
        "node_params": {
            "ClassificationFCSoftMaxTopK" : {
                "weights" : "graph_zoo/meta_googlenet/weights.h5"
            }
        },
        "next_node": ["googlenet_v1_accuracy"]
    },
    {
        "node_name": "googlenet_v1_accuracy",
        "node_params": {
            "ClassificationAccuracy": {
                "ground_truth":
                    "../../examples/deployment_modes/gold.txt"
            }
        },
        "next_node": [ ]
    } ] ,
}
```

Example 4

Graph 114 is an example of a directed acyclic graph created by the system manager 102 in response to one of the graph definitions 110. The exemplary graph 114 includes multiple subgraphs, which are labeled "pre-processing," "subgraph 1," "subgraph 2," "subgraph 3a," "subgraph 3b," and "post-processing." Each of the subgraphs is also a directed acyclic graph.

The graph illustrates the dependencies between nodes as directed edges that connect the nodes. For example, the task of node 116 of subgraph 1 is dependent on completion of the task of node 118 of the pre-processing subgraph. Note that the task of node 120 is dependent on completion of the tasks of nodes 122 and 124. A dependency of a child node on a parent node can be predicated on the task of the child node requiring data provided by the parent node.

The system manager creates task queues 126 for queueing tasks associated with the nodes in the graphs 106. Each task queue is assigned to queue the tasks indicated by one or more nodes in the graphs 106. If two or more nodes of the same graph or two or more nodes of different graphs have at least one associated kernel that is the same, one task queue can be assigned to queue the tasks associated with those two or more nodes. Thus, the threads associated with different kernel objects can dequeue tasks from the same task queue.

The functions of each kernel object are executed by one or more threads. The number of threads started by each kernel object can be in response to a configuration parameter of the kernel object. Different kernel objects can be configured to execute different numbers of threads. Each set of the sets of threads 128 represents the one or more threads executed by a particular kernel object.

Each thread dequeues tasks from the task queue assigned to the kernel object the thread is executing. After dequeuing a task, the thread activates the compute circuit associated with the kernel object to initiate processing of the dequeued task.

Each thread can also enqueue tasks to the task queues 126. A thread can enqueue a task represented by a node in response to completion of each task of each parent node of that node. For example, the task represented by node 120 can be enqueued in a task queue once the tasks represented by nodes 122 and 124 have been completed. The task queue to which a task is enqueued is the task queue that is associated with the node that represents the task.

Tasks from different ones of the graphs 106 can be enqueued in the same one of the task queues 126. The graphs 106 can be defined for different ML applications, and the tasks represented by each graph are independent of data processed by the tasks represented by each other graph. A task from one of the graphs 106 and another task from another one of the graphs can be enqueued to the same task queue (by separate threads of separate kernel objects) if both of the nodes that represent those tasks specify assignments to at least one kernel that is the same.

In order to demonstrate the relationships between graphs, task queues, kernel objects, threads, tasks, and compute circuits, FIGS. 2A-2J are provided.

FIG. 2A shows the relationship between a graph and task queues. One graph can be related to one or more task queues, because different tasks represented by nodes of the same graph can be enqueued in different task queues.

FIG. 2B shows the relationship between a task queue and graphs. One task queue can be related to one or more graphs, because nodes in different graphs can specify assignments of represented tasks to the same kernel, and those tasks can be enqueued in the assigned task queue.

FIG. 2C shows the relationship between kernel objects and a task queue. One or more kernel objects can be related to the same task queue, because a single node can specify an assignment of different kernels to process the task represented by the node, or multiple nodes can specify assignments of the same kernel to the tasks represented by those nodes.

FIG. 2D shows the relationship between a kernel object and a task queue. A particular kernel object can be related to only one task queue, because only one task queue is created for each kernel, though a task queue can be assigned to multiple kernels.

FIG. 2E shows the relationship between a kernel object and a set of threads. One kernel object can be related to one or more threads, because a kernel can be defined to have multiple threads execute on the kernel object.

FIG. 2F shows the relationship between threads and a particular task queue. One or more threads can be related to the same task queue, because one kernel object can be executed by multiple threads, and multiple kernel objects of different kernels can have threads that operate on the task queue for those kernels.

FIG. 2G shows the relationship between a particular thread and task queues. A thread can be related to multiple task queues. Though a thread dequeues tasks from only one task queue, a thread enqueues a task in the task queue assigned to the task represented by the next node to be processed.

FIG. 2H shows the relationship between a task and kernel objects. One task can be related to one or more kernel objects in that the task can be performed by any one of multiple kernel objects of the kernels specified by the node that represents the task.

FIG. 2I shows the relationship between a kernel object and a compute circuit. A kernel object is related to only one compute circuit, because the kernel object is defined to provide the interface to one compute circuit. The compute circuit can be a combination of different hardware components, such as a CPU and an FPGA.

FIG. 2J shows the relationship between a compute circuit and kernel objects. One compute circuit can be related to multiple kernel objects, because different kernel objects of different kernels can provide the interface to the same compute circuit for performing different tasks.

Figure 3:
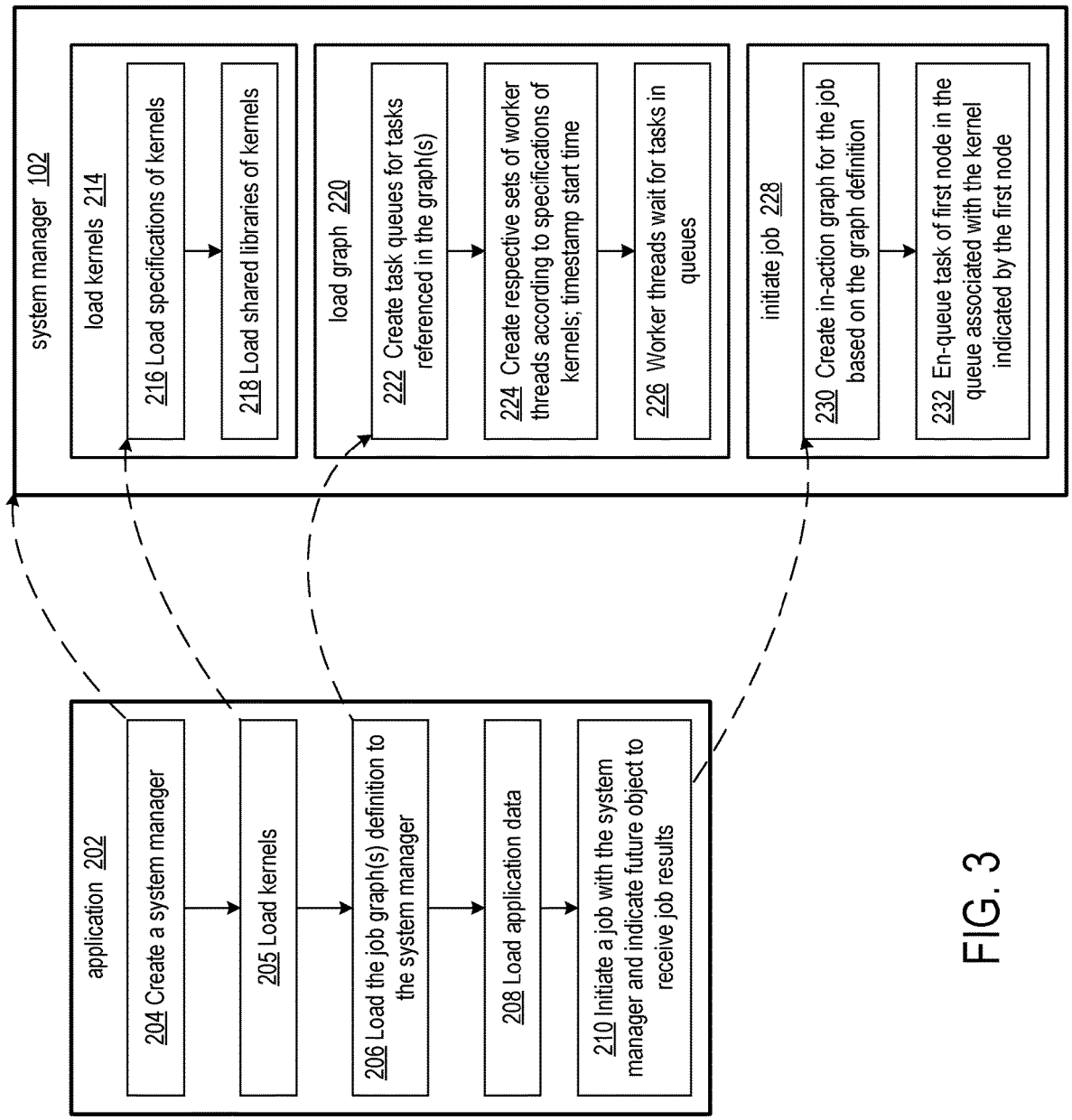
FIG. 3 shows a flow diagram of an ML application and a system manager according to the disclosed methods and systems.

FIG. 3 shows a flow diagram of an ML application 202 and a system manager 102 according to the disclosed methods and systems. The ML application can invoke functions of a system library. The system library can include base classes on which a designer can build custom kernel objects and graphs as described herein. Example 5 shows an example of an application constructed according to the disclosed methods.

```
/* Copyright 2019 Xilinx Inc.*/
int main(int argc, char **argv)
{
   int ret = 0;
   ...
   /// Get AKS System Manager instance
   AKS::SysManagerExt * sysMan =
AKS::SysManagerExt::getGlobal( );
   /// Load all kernels
   sysMan->loadKernels("kernel_zoo");
   /// Load graph
   sysMan->loadGraphs(graphJson) ;
   /// Get all the images in the given input directory,
   std::vector<std::string> images;
   int i = 0;
   for (boost::filesystem::directory_iterator it {imgDirPath};
        it != boost::filesystem::directory_iterator{ }; it++) {
      std::string fileExtension =
         it->path ( ) .extension!) .string ( ) ;
      if(fileExtension == ".jpg" || fileExtension == ".JPEG"||
            fileExtension == ".png")
         images.push_back((*it).path( ).string( ));
   }
   /// Get graph instance
   AKS::AIGraph *graph - sysMan->getGraph("goglenet");
   /// Enqueue the images to graph for execution
   for (auto& imagePath: images) {
      std::vector,AKS::DataDescriptor> v; v.reserve(3);
      sysMan->enqueueJob (graph, imagePath, std::move(v),
            nullptr);
   }
   /// Wait for results
   sysMan->waitForAllResults( ) ;
   /// Report - applicable for accuracy kernel
   sysMan->report(graph) ;
   AKS::SysManagerExt::deleteGlobal( );
   return ret;
}
```

Example 5

At block 204, the application can call a system library function to create a system manager 102. The system manager provides initialization functions for loading kernels at block 214, loading graph(s) at block 220, and initiating a job at block 228 (tasks of a job being defined by a graph as explained above).

At block 205, the application calls a system manager function to load kernels. The application specifies the kernel specification to be loaded. At block 216 the system manager loads the referenced kernel specifications, and at block 218 the system manager loads the shared libraries referenced by the kernel specifications. In loading the kernels, the system manager creates the kernel objects according to the kernel specifications.

At block 206, the application calls a system manager function to load a graph(s). The application specifies the graph(s) to be loaded. At block 222 the system manager loads the referenced graph(s) and creates task queues for the tasks represented by nodes in the graph(s). The kernel objects are assigned to the tasks queues by way of kernels being referenced by the nodes that represent the tasks queued in the task queues. The system manager can also perform node initialization functions such as loading weights and biases.

At block 224, the system manager starts respective sets of worker threads for the kernel objects defined by the loaded kernel specifications. The number of threads started for a kernel object is that defined in the kernel specification. The worker threads store timestamps of the start times in system memory for purposes of accumulating performance information pertaining to the kernel objects. The worker threads then wait at block 226 for tasks to appear in the task queues.

At block 208, the application loads data to be processed, such as from local retentive storage or a networked source, into memory that is accessible to the compute circuits. At block 210, the application instructs the system manager to initiate processing a job using the loaded data.

To initiate processing a job at block 228, the system manager creates an in-action graph for the job based on the graph definition of the job at block 230. Each in-action graph is associated with a job and has dedicated data buffers and related objects for that job. So when worker threads are processing tasks of different jobs, the threads do not need to communicate with one another because the threads are working on independent objects.

Each in-action graph is a lightweight representation in memory of an instance of a graph definition. The runtime data associated with processing a job until the job is complete is maintained in an in-action graph. For example, the in-action graph of a job can include a job identifier, the input data and output data of each node relevant to each node in the graph, the in-degree and out-degree of each node as the job is processed, application input parameters associated with the job, and reference to the full job graph definition. The in-action graph can have respective storage areas for output data generated by processing the tasks of the nodes. Once the tasks of an in-action graph are completed, the output is stored in a designated future object associated with the job, and the memory allocated to the in-action graph can be freed.

At block 232, the system manager enqueues the task represented by the first node of the graph in the task queue assigned to queue the task. A job can entail processing of multiple input datasets according to the tasks defined by a graph. For each new dataset input by the application 202 for processing of job, another in-action graph can be created for processing the new dataset. The system manager can continue to add tasks to the task queue associated with the first node of the in-action graph in response to a new dataset provided by the application. Once a job is complete, the application 202 can call on the system manager to store a timestamp indicating completion of the job.

The system manager 102 also supports loading of new kernels and loading of new graphs on-the-fly. That is, concurrent with threads are executing kernel objects (enqueuing tasks, dequeuing tasks, and activating compute circuits) for performing tasks associated with an already-instantiated graph, the application 202 can call on the system manager to load new kernels, generate another graph, and start any new threads needed to execute any new kernels.

Figure 4:
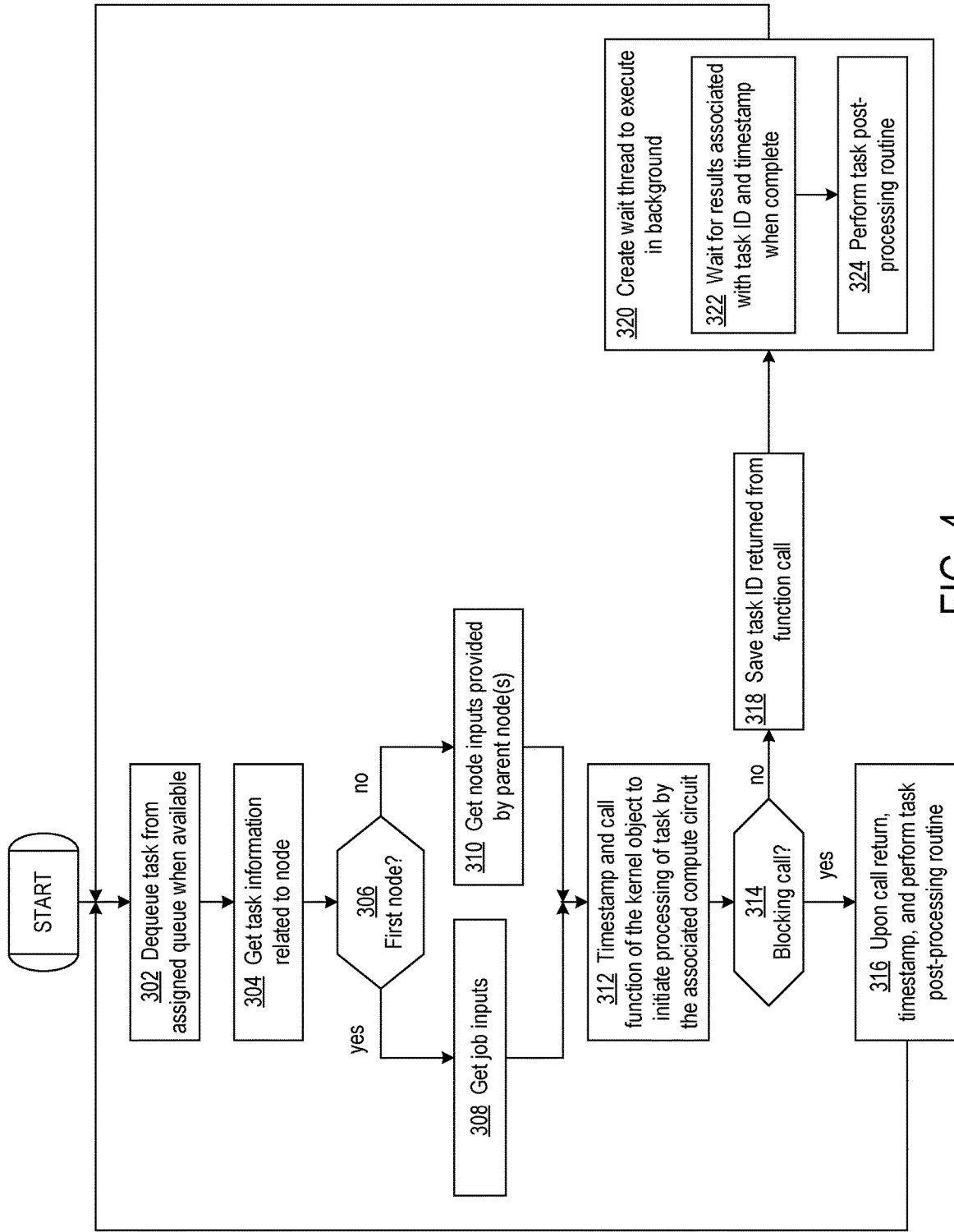
FIG. 4 shows a flowchart of an exemplary process performed by a worker thread according to the disclosed methods and systems.

FIG. 4 shows a flowchart of an exemplary process performed by a worker thread according to the disclosed methods and systems. At block 302, the worker thread dequeues a task (if a task is present) from the task queue assigned to that thread. Because an individual node may specify an assignment of the represented task to different kernels, and different nodes can specify intersecting sets of kernels, a thread will only dequeue tasks that the thread is qualified to dequeue. That is, a thread will only dequeue a task from the assigned task queue if the node that represents that task has assigned the kernel of the kernel object being executed by the thread. For example, if node N1 represents task T1 and assigns kernels K1 and K2, and node N2 represents task T2 and assigns kernels K2 and K3, the same task queue can queue tasks T1 and T2. The thread(s) executing the kernel object of K2 can dequeue both T1 and T2. However, the thread(s) executing the kernel object of K1 can only dequeue T1, and the kernel object of K3 can only dequeue T2.

At block 304, the thread uses the information associated with the task from the in-action graph structure, such as node parameters (e.g., image height, width, and number of channels, a path to weights, etc.), when calling the function of the kernel object to initiate processing of the task by the compute circuit (block 312).

At decision block 306, if the node is the first node in the graph, the input data to the task is that provided by the application as job inputs (block 308). Otherwise, at block 310 the thread can get the input data for the task from the part(s) of in-action graph having output data from the parent node(s) of node in process.

At block 312, the thread stores a timestamp indicating the start of processing of the task (if the associated compute circuit is synchronous) and calls the function of the kernel object to initiate processing of the task by the associated compute circuit. A task identifier can be stored in association with the timestamp in order to determine performance levels achieved for different tasks by the compute circuit. The kernel object can input the data to be processed and any parameters directly to the compute circuit, or communicate an address(es) of the data and parameters to the compute circuit. The addresses communicated to the compute circuit can include addresses of storage areas associated with the node in the in-action graph.

The definition of a kernel object specifies whether processing by the associated compute circuit will be initiated in a synchronous ("blocking" call) or an asynchronous manner ("non-blocking" call). Decision block 314 represents the divergence in the control paths for blocking and non-blocking calls to the functions that initiates processing by the compute circuits. For a blocking call, the worker thread does not continue processing at block 316 until the compute circuit completes processing of the task. For a non-blocking call, the thread continues at block 318 without waiting for the compute circuit to complete the task.

Figure 5:
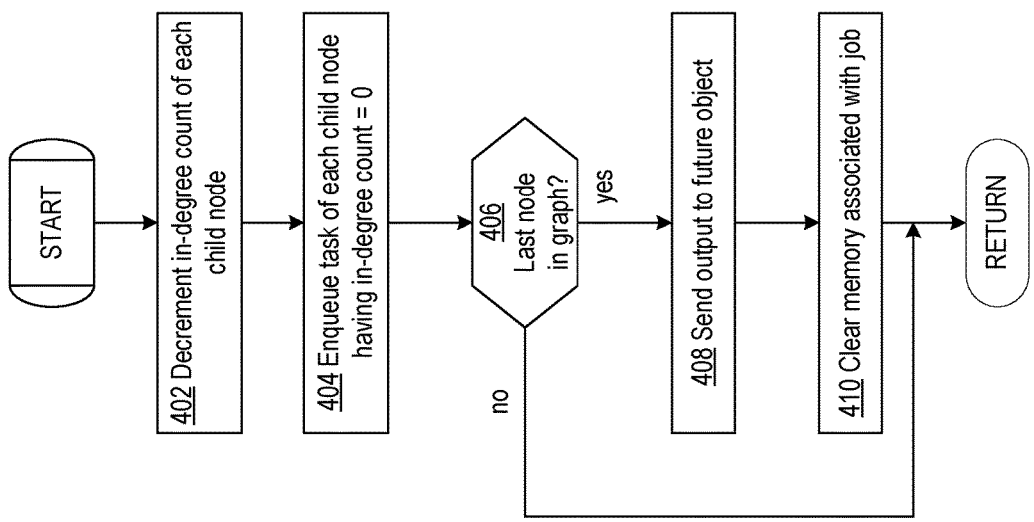
FIG. 5 shows a flowchart of the process performed by the task post-processing routine.

At block 316, the worker thread stores a timestamp indicating the return from the blocking call to indicate completion of the task and initiates a post-processing routine (FIG. 5). The post-processing routine enqueues another task, if appropriate, and frees memory if the job is complete. The thread then returns to block 302 to dequeue another task.

At block 318, the worker thread saves the task identifier returned from the call to the function that initiated the compute circuit. At block 320, the worker thread creates a "wait thread," which waits for the compute circuit to complete and provide results. Completion can be communicated through data stored in a memory location shared by the wait thread and the compute circuit.

In response completion of the task by the compute circuit, at block 322 the wait thread waits for completion of the task, and at block 324 calls the post-processing routine (FIG. 5).

FIG. 5 shows a flowchart of the process performed by the task post-processing routine, which is initiated when processing of a task is complete. The process can be performed by either a worker thread or a wait thread as shown in FIG. 4. At block 402, the process decrements the in-degree count, which is maintained in the in-action graph, of each child node of the node that represents the completed task. The in-degree count of a node initially indicates the number of parent nodes of that node on which the task represented by the node is dependent on output data.

At block 404, for each child node (of the node representing the complete task) having an in-degree count of 0, the process enqueues the task of the child node in the task queue assigned to the task. The enqueued task specifies the kernels eligible to process the task.

If the completed task is represented by the last node in the in-action graph, decision block 406 directs the process to block 408, and the process communicates the output data resulting from the task to a "future object," which can be a data structure specified when the job is initiated. At block 410, the process clears the memory associated with the job, such as by freeing the memory of the in-action graph. The post-processing routine then returns control to the caller.

The worker threads and optional wait threads enable an ML application designer or user to wait for results at multiple levels. The different levels at which results can be examined are job level, graph level, and system level. At the job level, the designer/user can program application 202 (FIG. 3) to wait to initiate another job until instructed to continue, such as by programming the application at block 202 to wait to be instructed to initiate another job.

At the graph level, the designer/user can program the application to wait for completion of processing of the tasks of all jobs associated with a graph. Waiting at the graph level can be programmed by programming a worker thread to interrupt processing once result data is present in the future object.

At the system level, the designer/user can elect to not suspend processing at all and examine results once all specified jobs for all graphs have completed.

The calculation of accuracy for the results produced in processing a task can be implemented by an accuracy kernel. For example, a graph can include one or more nodes that represent accuracy calculation tasks (each an "accuracy node"), and each such node can specify an "accuracy kernel". The task performed by an accuracy kernel is to calculate the accuracy of the results output by the parent node(s) of the accuracy node. The application can call the report function of the system manager, and the system manger calls the report function (KernelObject->report( )) on each kernel used in the graph. The report function of each kernel object outputs one or more of kernel statistics, kernel debug data, or kernel metadata at time of the call. The report function of the kernel is an optional base class function that a kernel object can optionally override. For example, an accuracy kernel is typically expected to have a report function because the accuracy kernel evaluates the accuracy of inference across all images. When the system manager calls the report function of the accuracy kernel, it would print out the accuracy numbers at that moment, thereby providing on-demand reporting from the kernel object independent from the thread(s) executing the kernel object.

The disclosed methods and systems support a debug feature that reports performance levels achieved in processing tasks by the kernels. Debug-reported performance levels can be used to identify bottlenecks and evaluate implementations of the kernel objects and compute circuits and/or increase the number of worker threads for selected kernel objects.

For synchronous compute circuits and kernel objects, the debug-reported performance data indicate utilization levels. The utilization level is the ratio of time spent by a worker thread executing a task (i.e., time spent by the compute engine performing the work of the task) to the total time the worker thread was running. The time spent by a worker thread executing a task(s) can be the time span (or sum of multiple time spans) indicated by the start and stop timestamps recorded at blocks 312 and 316 of FIG. 4. The utilization level(s) of a compute engine(s) can be monitored by the system manager, and the system manager can automatically increase the number of worker threads for a compute circuit if the utilization level of that compute circuit is greater than a threshold.

For asynchronous compute circuits and kernel objects, the debug-reported performance data indicate cumulative active times. The active time of an asynchronous compute circuit is the cumulative time that at least one task is present in the task queue having tasks to be processed by that compute circuit. A low active time indicates the compute circuit is underutilized.

Figure 6:
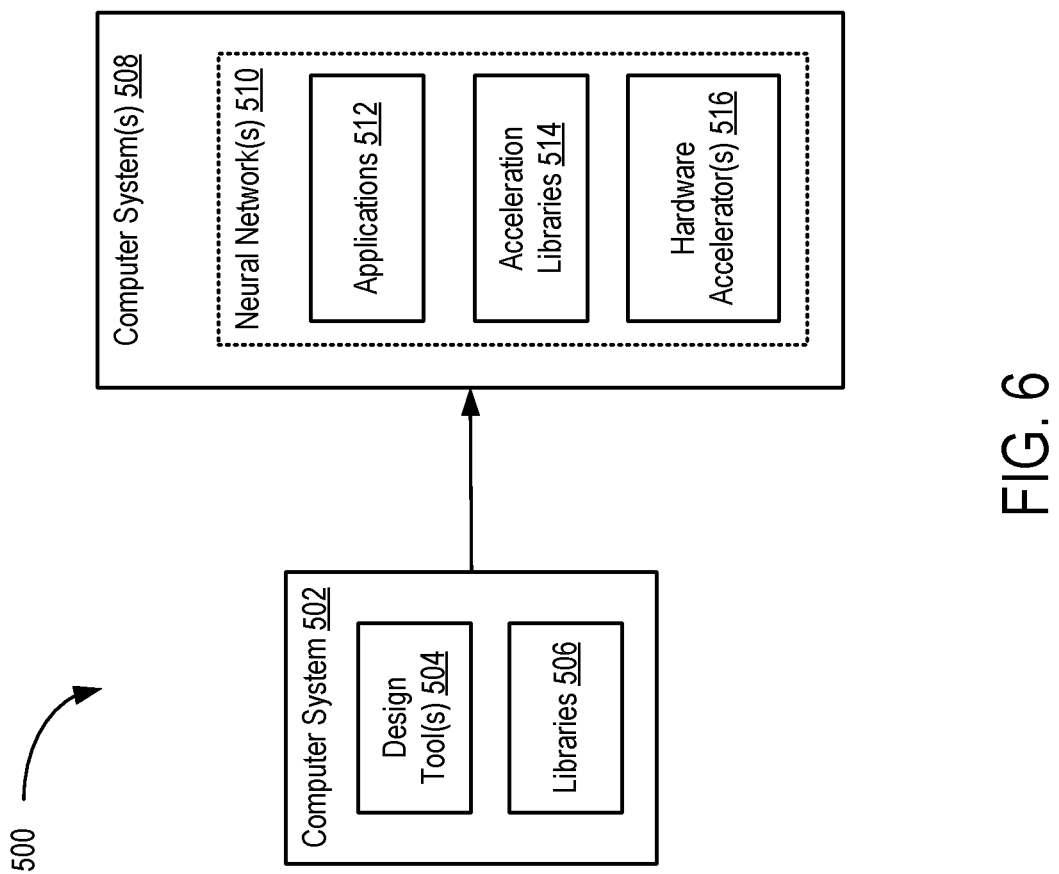
FIG. 6 is a block diagram depicting a system for implementing ML models including neural networks according to an example.
Figure 7:
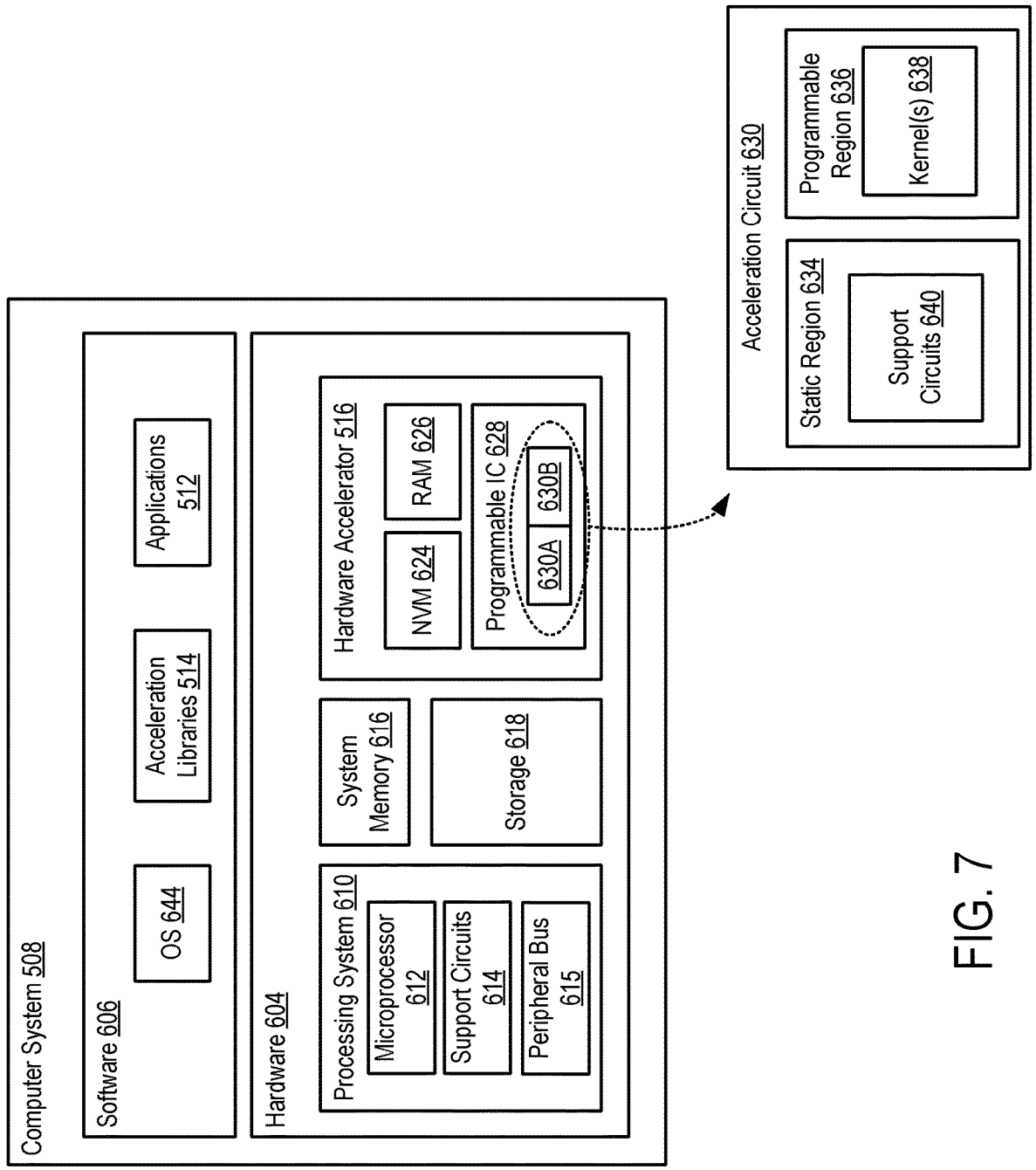
FIG. 7 is a block diagram depicting a computing system according to an example.
Figure 8:
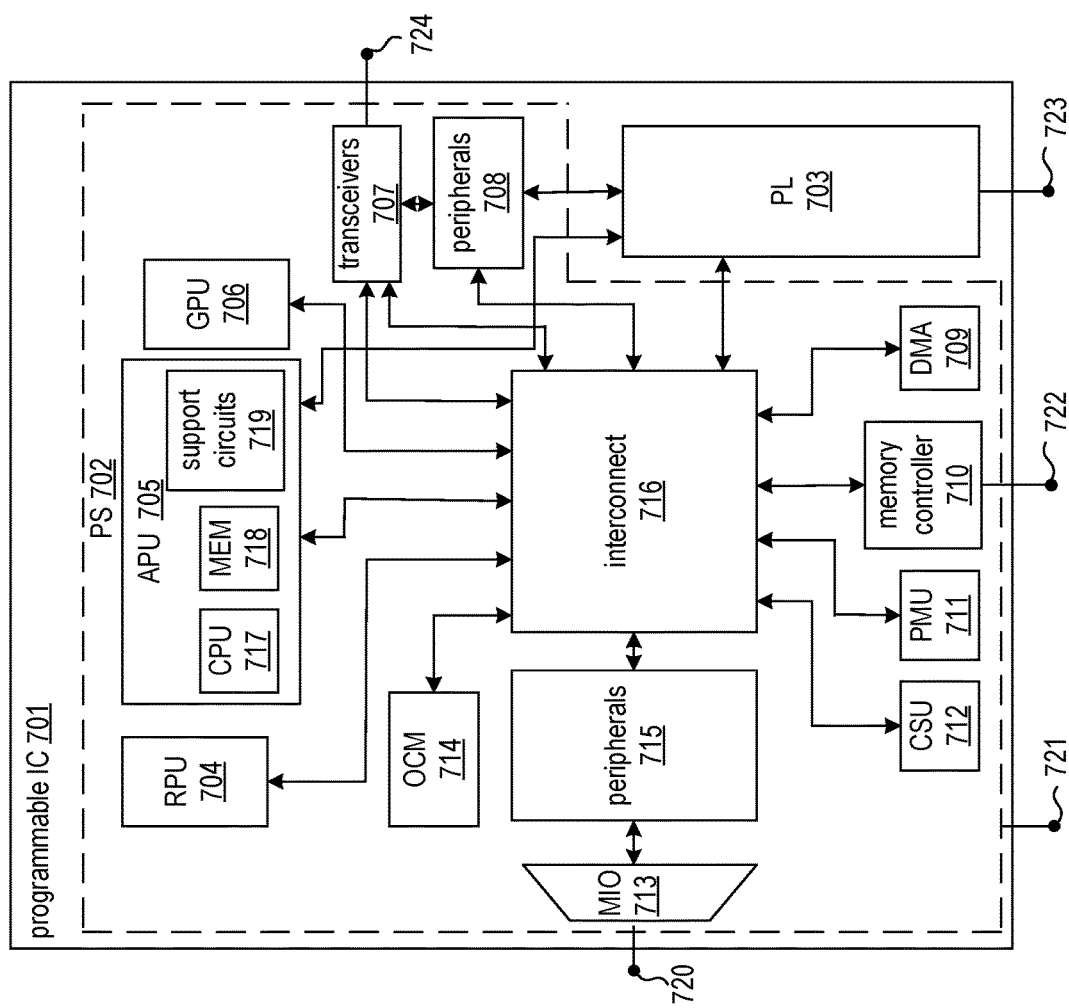
FIG. 8 is a block diagram depicting an exemplary System-on-Chip (SoC).

FIGS. 6, 7, and 8 illustrate computing systems and hardware one ML applications can be implemented according to the disclosed ML framework.

FIG. 6 is a block diagram depicting a system 500 for implementing ML models including neural networks according to an example. The system 500 includes a computer system 502 and one or more computer systems 508. The computer system 502 includes conventional computing components configured to execute software that provides one or more design tools 504. Each computer system 508 implements one or more neural networks 510. The neural network(s) 510 are implemented using applications 512, acceleration libraries 514, and one or more hardware accelerators 516. The applications 512 and acceleration libraries can be constructed according to the approaches described herein.

In an example, the hardware accelerator(s) 516 include programmable integrated circuits (Ics), such as field programmable gate arrays (FPGAs). The acceleration libraries 514 provide application programming interfaces (APIs) to interface with the hardware accelerator(s) 516. The acceleration libraries 514 can also include libraries that provide neural network functions, including predefined and optimized implementations of neural network layers and other types of neural network structures. Thus, the neural network(s) 510 can include both hardware portions implemented in the hardware accelerator(s) 516, as well as software portions implemented in the acceleration libraries 514. The applications 512 invoke the APIs of the acceleration libraries 514 to program and control the hardware accelerator(s) 516 to implement the neural network(s) 516.

A designer interacts with the design tool(s) 504 to define the neural network(s) 510. The design tool(s) 504 can generate files for programming the hardware accelerator(s) 516 (e.g., configuration bitstreams for FPGAs), files that provide the acceleration libraries 514, and files that provide the applications 512. The designer can define the hardware portions of the neural network(s) 510 using a register transfer language (RTL) or using a programming language, such as C, C++, OpenCL, and the like, or a combination of RTL and programmable language(s). The user can define the software portions of the neural network(s) 510 using a programming language, such as C, C++, OpenCL, etc. The design tool(s) 504 compile the software-defined neural networks to generate files for programming the hardware accelerator(s) 516 and library files for the acceleration libraries 514. The designer can make use of libraries 506 that provide class libraries, template libraries, and the like to assist in developing the hardware and software portions of the neural network(s) 510.

A user can define the applications 512 using a programming language (e.g., C, C++, Python, etc.). The user can make use of neural network frameworks and libraries, using the approaches described herein.

FIG. 7 is a block diagram depicting a computing system 508 according to an example. The computing system 508 includes hardware 604 and software 606 executing on the hardware 604. The hardware 604 includes a processing system 610, system memory 616, storage device(s) ("storage 618"), and a hardware accelerator 516 (or "ML accelerator"). The software 606 includes an operating system (OS) 644, the acceleration libraries 514, and the applications 512. The processing system 610, system memory 616, and storage 618 comprise a host computer system as referenced herein.

The processing system 610 includes a microprocessor 612, support circuits 614, and a peripheral bus 615. The microprocessor 612 can be any type of general-purpose central processing unit (CPU), such as an x86-based processor, ARM®-based processor, or the like. The microprocessor 612 can include one or more cores and associated circuitry (e.g., cache memories, memory management units (MMUs), interrupt controllers, etc.). The microprocessor 612 is configured to execute program code that perform one or more operations described herein and which can be stored in the system memory 616 and/or the storage 618. The support circuits 614 include various devices that cooperate with the microprocessor 612 to manage data flow between the microprocessor 612, the system memory 616, the storage 618, the hardware accelerator 516, or any other peripheral device. For example, the support circuits 614 can include a chipset (e.g., a north bridge, south bridge, platform host controller, etc.), voltage regulators, firmware (e.g., a BIOS), and the like. The support circuits 614 manage data flow between the microprocessor 612 and the peripheral bus 615, to which various peripherals, such as the hardware accelerator 516, are connected. In some examples, the microprocessor 612 can be a System-in-Package (SiP), System-on-Chip (SoC), or the like, which absorbs all or a substantial portion of the functionality of the chipset (e.g., north bridge, south bridge, etc.). The peripheral bus 615 can implement an expansion bus standard, such as Peripheral Component Interconnect Express (PCIe). In the example, the processing system 610 is shown separate from the hardware accelerator 516. In other examples discussed further below, the processing system 610 and the hardware accelerator 516 can be implemented on the same integrated circuit (IC) using a System-On-Chip (SoC).

The system memory 616 is a device allowing information, such as executable instructions and data, to be stored and retrieved. The system memory 616 can include, for example, one or more random access memory (RAM) modules, such as double-data rate (DDR) dynamic RAM (DRAM). The storage device 618 includes local storage devices (e.g., one or more hard disks, flash memory modules, solid state disks, and optical disks) and/or a storage interface that enables the computing system 508 to communicate with one or more network data storage systems. The hardware 604 can include various other conventional devices and peripherals of a computing system, such as graphics cards, universal serial bus (USB) interfaces, and the like.

The hardware accelerator 516 includes a programmable IC 628, a non-volatile memory (NVM) 624, and RAM 626. The programmable IC 628 can be an FPGA or the like or an SoC having an FPGA or the like. The NVM 624 can include any type of non-volatile memory, such as flash memory or the like. The RAM 626 can include DDR DRAM or the like. The programmable IC 628 is coupled to the NVM 624 and the RAM 626. The programmable IC 628 is also coupled to the peripheral bus 615 of the processing system 610.

The OS 644 can be any commodity operating system known in the art, such as Linux®, Microsoft Windows®, Mac OS®, or the like. The acceleration libraries 514 includes drivers and libraries that provide APIs for command and control of the hardware accelerator 516. The applications 512 include software executing on the microprocessor 612 that invokes the APIs of the acceleration libraries 514 to implement neural network(s).

In operation, the programmable IC 628 is configured with an acceleration circuit 630. The acceleration circuit 630 generally includes a base platform 630A and a neural network accelerator 630B. For example, the acceleration circuit 630 can be implemented using a static region 634 and a programmable region 636. The static region 634 includes support circuits 640 for providing an interface to the peripheral bus 615, the NVM 624, and the RAM 626. The programmable region 636 can include one or more neural network accelerators ("kernel(s) 638"). The base platform 630A is implemented using the static region 634, and the neural network accelerator 630B is implemented using the programmable region 636. In another example, the base platform 630A can also be implemented using a portion of the programmable region 636. Thus, in some examples, the programmable region 636 also includes some interface circuits. In some examples, the acceleration circuit 630 can include more than one programmable region 636, each of which can be individually configured with neural network accelerator(s) 638.

FIG. 8 is a block diagram depicting an exemplary System-on-Chip (SoC) 701. In the example, the SoC includes the processing subsystem (PS) 702 and the programmable logic subsystem 703. The processing subsystem 702 includes various processing units, such as a real-time processing unit (RPU) 704, an application processing unit (APU) 705, a graphics processing unit (GPU) 706, a configuration and security unit (CSU) 712, and a platform management unit (PMU) 711. The PS 702 also includes various support circuits, such as on-chip memory (OCM) 714, transceivers 707, peripherals 708, interconnect 716, DMA circuit 709, memory controller 710, peripherals 715, and multiplexed (MIO) circuit 713. The processing units and the support circuits are interconnected by the interconnect 716. The PL subsystem 703 is also coupled to the interconnect 716. The transceivers 707 are coupled to external pins 724. The PL 703 is coupled to external pins 723. The memory controller 710 is coupled to external pins 722. The MIO 713 is coupled to external pins 720. The PS 702 is generally coupled to external pins 721. The APU 705 can include a CPU 717, memory 718, and support circuits 719. The APU 705 can include other circuitry, including L1 and L2 caches and the like. The RPU 704 can include additional circuitry, such as L1 caches and the like. The interconnect 716 can include cache-coherent interconnect or the like.

Referring to the PS 702, each of the processing units includes one or more central processing units (CPUs) and associated circuits, such as memories, interrupt controllers, direct memory access (DMA) controllers, memory management units (MMUs), floating point units (FPUs), and the like. The interconnect 716 includes various switches, busses, communication links, and the like configured to interconnect the processing units, as well as interconnect the other components in the PS 702 to the processing units.

The OCM 714 includes one or more RAM modules, which can be distributed throughout the PS 702. For example, the OCM 714 can include battery backed RAM (BBRAM), tightly coupled memory (TCM), and the like. The memory controller 710 can include a DRAM interface for accessing external DRAM. The peripherals 708, 715 can include one or more components that provide an interface to the PS 702. For example, the peripherals can include a graphics processing unit (GPU), a display interface (e.g., DisplayPort, high-definition multimedia interface (HDMI) port, etc.), universal serial bus (USB) ports, Ethernet ports, universal asynchronous transceiver (UART) ports, serial peripheral interface (SPI) ports, general purpose (GPIO) ports, serial advanced technology attachment (SATA) ports, PCIe ports, and the like. The peripherals 715 can be coupled to the MIO 713. The peripherals 708 can be coupled to the transceivers 707. The transceivers 707 can include serializer/deserializer (SERDES) circuits, MGTs, and the like.

Though aspects and features may in some cases be described in individual figures, it will be appreciated that features from one figure can be combined with features of another figure even though the combination is not explicitly shown or explicitly described as a combination.

The methods and system are thought to be applicable to a variety of systems for calibrating scale factors. Other aspects and features will be apparent to those skilled in the art from consideration of the specification. The methods and system may be implemented as one or more processors configured to execute software, as an application specific integrated circuit (ASIC), or as a logic on a programmable logic device. It is intended that the specification and drawings be considered as examples only, with a true scope of the invention being indicated by the following claims.

What is claimed is:

1. A method comprising:
   instantiating a plurality of kernel objects by a computer processor in response to input of a plurality of kernel definitions, respectively, wherein each kernel object is of a kernel type of a plurality of kernel types, and each kernel type indicates a compute circuit of a heterogeneous plurality of compute circuits;
   generating a graph in a memory by the computer processor, wherein the graph has nodes and edges, each node represents a task and specifies an assignment of the task to one or more of the kernel objects, and each edge represents a data dependency between the nodes;
   creating a plurality of task queues in the memory, and assigning each task queue to queue tasks represented by one or more of the nodes;
   assigning each of the kernel objects to one of the task queues;
   enqueuing the tasks represented by the nodes in the plurality of task queues by threads executing the kernel objects on the computer processor, based on assignments of the kernel objects to the task queues and assignments of the tasks to the kernel objects; and dequeuing the tasks from the plurality of task queues by the threads executing the kernel objects based on the assignments of the kernel objects to the task queues and the assignments of the tasks to the kernel objects, and activating ones of the compute circuits by the threads executing the kernel objects to initiate processing of the dequeued tasks.

2. The method of claim 1, further comprising:

waiting, in response to definition of a kernel object of the plurality of kernel objects being blocking, to dequeue another task from a task queue of the plurality of task queues by the thread executing the kernel object, until processing of a previous task dequeued by the thread executing the kernel object is complete; and continuing to the dequeuing, in response to definition of a kernel object of the plurality of kernel objects being non-blocking, of another task from a task queue of the plurality of task queues by the thread executing the kernel object without waiting for processing of the previous task dequeued by the thread executing the kernel object to complete.

3. The method of claim 1, further comprising:

generating a plurality of graphs in the memory, wherein the tasks represented by each graph are independent of data processed by the tasks represented by each other graph, and each graph has nodes and edges, each node represents a task and specifies an assignment of the task to one or more of the kernel objects, and each edge represents a data dependency between the nodes; and wherein the enqueuing includes enqueuing in at least one task queue of the plurality of task queues, a first task represented by a node in a first graph of the plurality of graphs and a second task represented by a node in a second graph of the plurality of graphs.

4. The method of claim 1, wherein:

the respective kernel types include a first kernel type, and the plurality of kernel objects includes a first kernel object and a second kernel object of the first kernel type;

the dequeuing includes:

dequeuing a first task from a first task queue of the plurality of task queues by a thread executing the first kernel object, and activating a first compute circuit of the plurality of compute circuits indicated by the first kernel type to initiate processing of the first task; and dequeuing a second task from the first task queue by a thread executing the second kernel object, and activating the first compute circuit to initiate processing of the second task.

5. The method of claim 1, wherein:

the respective kernel types include a first kernel type and a second kernel type, and the plurality of kernel objects includes a first kernel object of the first kernel type and a second kernel object of the second kernel type;

the dequeuing includes:

dequeuing a first task from a first task queue of the plurality of task queues by a thread executing the first kernel object, and activating a first compute circuit of the plurality of compute circuits indicated by the first kernel type to initiate processing of the first task; and dequeuing a second task from the first task queue by a thread executing the second kernel object, and activating a second compute circuit indicated by the second kernel type to initiate processing of the second task.

6. The method of claim 1, wherein:

the instantiating the plurality of kernel objects includes executing at least one of the kernel objects by two or more threads; and the dequeuing includes dequeuing, based assignment of at least one of the kernel objects to one of the task queues, tasks from the one of the task queues by the two or more threads, and activating the compute circuit indicated by the kernel type of the at least one of the kernel objects by the two or more threads to initiate processing of the dequeued tasks.

7. The method of claim 6, wherein the instantiating the plurality of kernel objects includes selecting a number of threads to execute by the at least one kernel object in response to a configurable parameter associated with the at least one kernel object.

8. The method of claim 7, further comprising:

measuring performance of the plurality of compute circuits by the kernel objects; and adjusting the configurable parameter to adjust the number of threads to execute in response to the performance measured for the compute circuit associated with the at least one kernel object.

9. The method of claim 1, further comprising:

generating a plurality of graphs in the memory, wherein the tasks represented by each graph are independent of data processed by the tasks represented by each other graph, each graph includes respective storage areas for output data generated by the nodes of the graph, each graph has nodes and edges, each node represents a task and specifies an assignment of the task to one or more of the kernel objects, and each edge represents a data dependency between the nodes;

wherein the activating of a compute circuit of the ones of the compute circuits to initiate processing of a dequeued task includes:

communicating one or more memory addresses of one or more of the respective storage areas to the compute circuit, wherein each of the one or more of the respective storage areas has output data produced in processing a task represented by a parent node of the node of the dequeued task, and the dequeued task is dependent on the output data; and communicating to the compute circuit, a memory address of the respective storage area for output data generated in processing of the dequeued task.

10. The method of claim 9, wherein:

each graph includes storage for respective in-degree counts of the nodes of the graph, and each in-degree count indicates a number of parent nodes of a node of the graph on which the task represented by the node is dependent on output data;

decrementing an in-degree count of a node of a graph by thread executing a kernel object in response to completion of a task represented by a parent node of the node; and wherein the enqueuing includes enqueuing the task represented by the node of the graph in response to the in-degree count indicating completion of each task of each parent node of the node.

11. The method of claim 1, wherein:

the instantiating the plurality of kernel objects includes executing each of the kernel objects by one or more threads;

determining respective utilization levels of the kernel objects; and automatically increasing a number of threads executing a kernel object in response to the respective utilization level of the kernel object being greater than a threshold.

12. The method of claim 1, further comprising executing a report function of a system manager on-demand during processing of the graph, wherein the system manager calls a report function of each kernel object, and the report function outputs one or more of kernel statistics, kernel debug data, or kernel metadata at time of the call.

13. The method of claim 1, further comprising:

concurrent with the the enqueing and the dequeuing of tasks, generating another graph in the memory by the computer processor, wherein the other graph has nodes and edges, wherein each node represents a task and specifies an assignment of the task to one or more of the kernel objects, and each edge represents a data dependency between the nodes; and performing the enqueuing and dequeuing of tasks the tasks represented by the nodes of the other graph.

14. A system comprising:

one or more processors;

a memory arrangement configured with instructions that when executed by the one or more processors cause the one or more processors to perform operations including:

instantiating a plurality of kernel objects in response to input of a plurality of kernel definitions, respectively, wherein each kernel object is of a kernel type of a plurality of kernel types, and each kernel type indicates a compute circuit of a heterogeneous plurality of compute circuits;

generating a graph in the memory arrangement, wherein the graph has nodes and edges, each node represents a task and specifies an assignment of the task to one or more of the kernel objects, and each edge represents a data dependency between the nodes;

creating a plurality of task queues in the memory arrangement, and assigning each task queue to queue tasks represented by one or more of the nodes;

assigning each of the kernel objects to one of the task queues;

enqueuing the tasks represented by the nodes in the plurality of task queues by threads executing the kernel objects, based on assignments of the kernel objects to the task queues and assignments of the tasks to the kernel objects; and dequeuing the tasks from the plurality of task queues by the threads executing the kernel objects based on the assignments of the kernel objects to the task queues and the assignments of the tasks to the kernel objects, and activating ones of the compute circuits by the threads executing the kernel objects to initiate processing of the dequeued tasks.

15. The system of claim 14, wherein the memory arrangement is further configured with instructions that when executed cause the one or more processors to:

wait, in response to definition of a kernel object of the plurality of kernel objects being blocking, to dequeue another task from a task queue of the plurality of task queues by the thread executing the kernel object, until processing of a previous task dequeued by the thread executing the kernel object is complete; and continue to the dequeuing, in response to definition of a kernel object of the plurality of kernel objects being non-blocking, of another task from a task queue of the plurality of task queues by the thread executing the kernel object without waiting for processing of the previous task dequeued by the thread executing the kernel object to complete.

16. The system of claim 14, wherein the memory arrangement is further configured with instructions that when executed cause the one or more processors to:

generate a plurality of graphs in the memory arrangement, wherein the tasks represented by each graph are independent of data processed by the tasks represented by each other graph, and each graph has nodes and edges, each node represents a task and specifies an assignment of the task to one or more of the kernel objects, and each edge represents a data dependency between the nodes; and wherein the instructions for enqueuing include instructions for enqueuing in at least one task queue of the plurality of task queues, a first task represented by a node in a first graph of the plurality of graphs and a second task represented by a node in a second graph of the plurality of graphs.

17. The system of claim 14, wherein:

the respective kernel types include a first kernel type, and the plurality of kernel objects includes a first kernel object and a second kernel object of the first kernel type;

the instructions for dequeuing include instructions for:

dequeuing a first task from a first task queue of the plurality of task queues by a thread executing the first kernel object, and activating a first compute circuit of the plurality of compute circuits indicated by the first kernel type to initiate processing of the first task; and dequeuing a second task from the first task queue by a thread executing the second kernel object, and activating the first compute circuit to initiate processing of the second task.

18. The system of claim 14, wherein:

the respective kernel types include a first kernel type and a second kernel type, and the plurality of kernel objects includes a first kernel object of the first kernel type and a second kernel object of the second kernel type;

the instructions for dequeuing include instructions for:

dequeuing a first task from a first task queue of the plurality of task queues by a thread executing the first kernel object, and activating a first compute circuit of the plurality of compute circuits indicated by the first kernel type to initiate processing of the first task; and dequeuing a second task from the first task queue by a thread executing the second kernel object, and activating a second compute circuit indicated by the second kernel type to initiate processing of the second task.

19. The system of claim 14, wherein:

the instructions for instantiating the plurality of kernel objects include instructions for executing at least one of the kernel objects by two or more threads; and the instructions for dequeuing include instructions for dequeuing, based assignment of at least one of the kernel objects to one of the task queues, tasks from the one of the task queues by the two or more threads, and activating the compute circuit indicated by the kernel type of the at least one of the kernel objects by the two or more threads to initiate processing of the dequeued tasks.

20. The system of claim 14, wherein the memory arrangement is further configured with instructions that when executed cause the one or more processors to:
- generate a plurality of graphs in the memory, wherein the tasks represented by each graph are independent of data processed by the tasks represented by each other graph, each graph includes respective storage areas for output data generated by the nodes of the graph, each graph has nodes and edges, each node represents a task and specifies an assignment of the task to one or more of the kernel objects, and each edge represents a data dependency between the nodes;
- wherein the instructions for activating of a compute circuit of the ones of the compute circuits to initiate processing of a dequeued task include instructions for:
  - communicating one or more memory addresses of one or more of the respective storage areas to the compute circuit, wherein each of the one or more of the respective storage areas has output data produced in processing a task represented by a parent node of the node of the dequeued task, and the dequeued task is dependent on the output data; and
  - communicating to the compute circuit, a memory address of the respective storage area for output data generated in processing of the dequeued task.

* * * * *